United States Patent
Song et al.

(10) Patent No.: US 7,087,342 B2
(45) Date of Patent: Aug. 8, 2006

(54) REGENERATIVE PASSIVE AND SEMI-ACTIVE SUSPENSION

(75) Inventors: Xubin Song, Canton, MI (US); Zhesheng Li, Dearborn Heights, MI (US); Jeremy Richard Edmondson, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 364 days.

(21) Appl. No.: 10/417,273

(22) Filed: Apr. 15, 2003

(65) Prior Publication Data

US 2004/0206559 A1    Oct. 21, 2004

(51) Int. Cl.
  *H01M 8/00*    (2006.01)
(52) U.S. Cl. .................. 429/48; 318/376; 180/65.1; 180/65.5; 364/424.5
(58) Field of Classification Search ............... 429/48; 318/376; 180/65.1; 364/424.5
  See application file for complete search history.

(56) References Cited

U.S. PATENT DOCUMENTS

| | | |
|---|---|---|
| 3,559,027 A | 1/1971 | Arsem |
| 3,807,678 A | 4/1974 | Kamopp et al. |
| 3,861,487 A | 1/1975 | Gill |
| 3,921,746 A | 11/1975 | Lewus |
| 3,927,728 A | 12/1975 | Reime |
| 4,024,926 A | 5/1977 | Butoi |
| 4,032,829 A | 6/1977 | Schenavar |
| 4,295,538 A | 10/1981 | Lewus |
| 4,381,041 A | 4/1983 | Butoi |
| 4,387,781 A | 6/1983 | Ezell et al. |
| 4,815,575 A | 3/1989 | Murty |
| 4,892,328 A | 1/1990 | Kurtzman et al. |
| 4,981,309 A | 1/1991 | Froeschle et al. |
| 5,091,679 A | 2/1992 | Murty et al. |
| 5,337,560 A | 8/1994 | Abdelmalek |
| 5,570,286 A * | 10/1996 | Margolis et al. .............. 701/36 |
| 5,590,734 A | 1/1997 | Caires |
| 6,111,375 A | 8/2000 | Zenobi |

* cited by examiner

*Primary Examiner*—Dah-Wei Yuan
(74) *Attorney, Agent, or Firm*—Brinks Hofer Gilson & Lione

(57) ABSTRACT

The present invention provides regenerative passive and semi-active suspension systems. A regenerative suspension system generally includes at least one regenerative damper, a module, an electric switch, and a battery. The at least one regenerative damper converts mechanical vibration energy within a vehicle into a voltage, which the damper passes to the module. The module measures the voltage from the regenerative damper, and in response, changes electric switch settings for each regenerative damper between an open circuit, a closed circuit completed by a power resistance, and a closed circuit completed by circuitry for charging a battery. Additionally, the module sets electric switch levels to adjust the damping forces within each regenerative damper.

15 Claims, 5 Drawing Sheets

REGENERATIVE PASSIVE AND SEMI-ACTIVE SUSPENSION

FIELD OF INVENTION

This invention relates to vehicle suspension systems. More specifically, this invention relates to regenerative vehicle suspension systems that recover energy lost during vehicle operations.

BACKGROUND OF THE INVENTION

Traditionally, vehicle suspension systems improve the ride and handling performance of a vehicle by utilizing passive or semi-active dampers. Within the suspension system, dampers prevent response overshoots and minimize unavoidable resonances within a vehicle such as those resonances caused by uneven roadways.

In the past, dampers were designed with solid elements, but recently, dampers have been designed with hydraulic or intelligent fluids to dissipate mechanical vibration energy through friction and viscosity as heat. Suspension systems utilize these dampers to improve the ride and handling performance of the vehicle, but at the cost of losing power during the dissipation. For a single vehicle using four dampers, the loss of power can be approximately two horsepower, which significantly affects vehicle performance.

Therefore, for reasons such as to increase fuel economy, it is desirable to have a regenerative suspension system that recovers the power lost during dissipation of mechanical vibration energy within the dampers.

BRIEF SUMMARY OF THE INVENTION

Accordingly, the present invention provides a regenerative passive suspension system and a regenerative semi-active suspension system. A regenerative suspension system generally includes at least one regenerative damper, a module, an electric switch, and a battery.

The at least one regenerative damper converts mechanical vibration energy within a vehicle into a voltage. The module measures the voltage produced by each regenerative damper, and in response, changes electric switch settings to implement a regenerative suspension strategy. Within the regenerative suspension strategy, the electric switch changes electric connections for each regenerative damper between an open circuit, a closed circuit completed by a power resistance, and a closed circuit completed by circuitry for charging a battery. Additionally, the module adjusts the damping forces within each regenerative damper depending on the direction of movement of the regenerative damper.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and descriptions are to be regarded as illustrations in nature and not as restrictive.

DETAILED DESCRIPTION OF THE PREFERRED EMBODIMENTS

Figure 1:
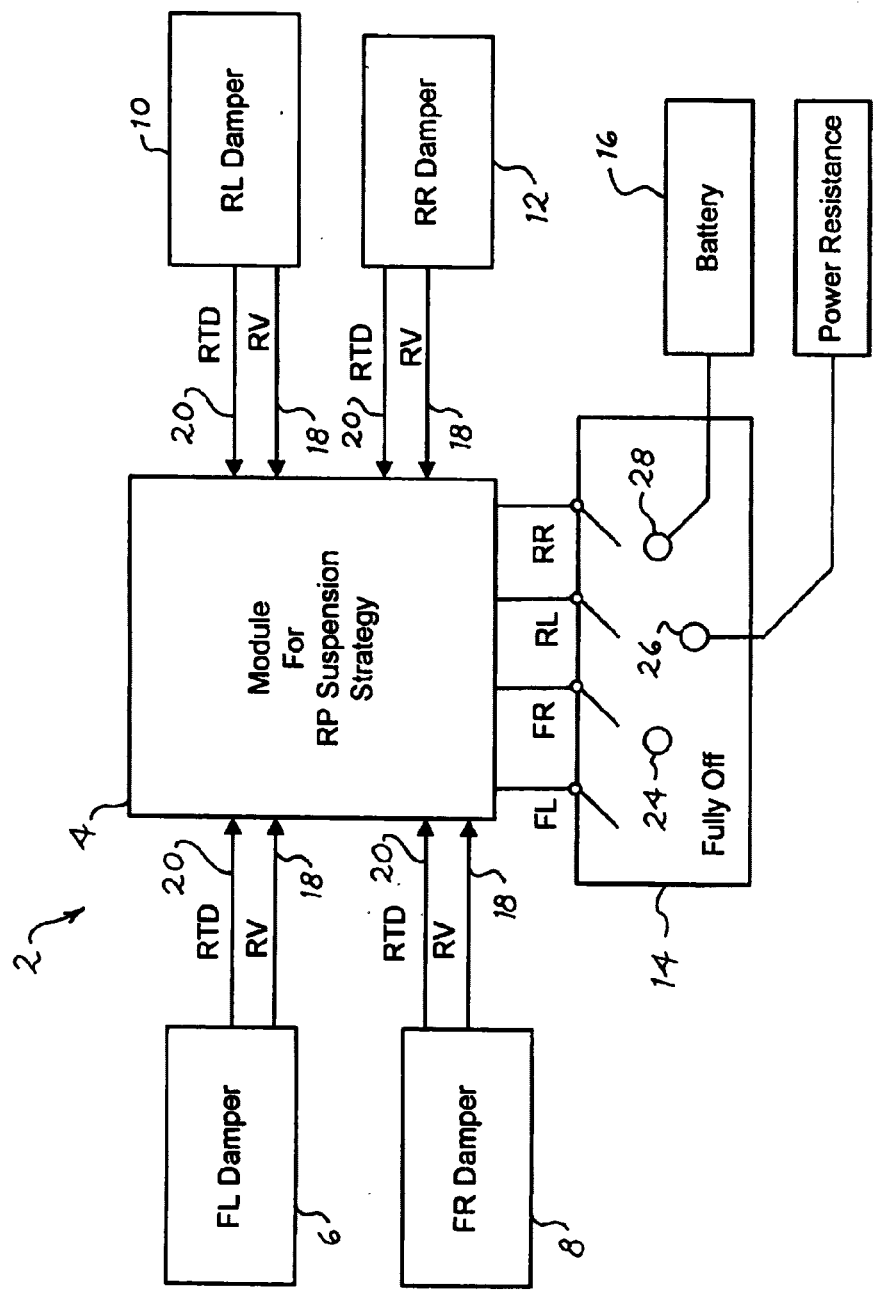
FIG. 1 is a schematic diagram of a regenerative passive suspension system in accordance with the present invention.

This invention relates to regenerative passive and semi-active suspension systems. As shown in FIG. 1, a regenerative suspension system 2 generally includes a module 4, at least one regenerative damper, an electric switch 14, and a battery 16. Preferably, the module 4 is an electric circuit or a micro-controller. Additionally, the battery 16 is preferably a car battery, but any power storage system capable of holding a sufficient charge could be used.

In one embodiment, the regenerative suspension system 2 acts as a regenerative passive suspension system due to the module 4 implementing a regenerative passive suspension strategy. A regenerative passive suspension strategy is one in which the at least one regenerative damper has a fixed damping force-relative velocity relationship.

In general, each regenerative damper creates a regenerative voltage 18 and a regenerative travel direction signal 20. The module 4 reads the regenerative voltage 18 and regenerative travel direction signal 20, and in response, changes the electric switch 14 settings between an open circuit 24, a closed circuit completed by a power resistance 26, and a closed circuit completed by circuitry 28 for charging the battery 16. An open circuit prevents current from flowing within the regenerative damper, resulting in no damping forces within the dampers. A closed circuit completed by the power resistance 26 results in current flowing within the regenerative damper which is sufficient for creating damping forces, but not sufficient for charging the battery 16. A closed circuit completed by circuitry 28 for charging the battery 16 results in a current flow which is sufficient to charge the battery 16 and sufficient to create damping forces within the regenerative damper. Additionally, while the circuitry of the regenerative damper is closed with the power resistance 26 or circuitry 28 for charging the battery 16, the module 4 changes switch levels to adjust the damping forces within each regenerative damper depending on the regenerative travel direction signal 20 value.

Describing the regenerative suspension system 2 in greater detail, the regenerative suspension system 2 preferably contains a front-left regenerative damper (FL damper) 6, a front-right regenerative damper (FR damper) 8, a rear-left regenerative damper (RL damper) 10, and a rear-right regenerative damper (RR damper) 12 corresponding to the wheels of a typical vehicle. Each regenerative damper converts mechanical vibrations into a regenerative voltage 20 and creates a regenerative travel direction signal 20 to indicate whether the damper is in a compression or rebound state. Hardware within the regenerative damper may create the regenerative travel direction signal 20 or the signal may be obtained by measuring the phase of the regenerative voltage 20. Preferably, the value of the regenerative travel direction signal 20 is positive when the damper is in a rebound state and negative when the damper is in a compression state.

Figure 2:
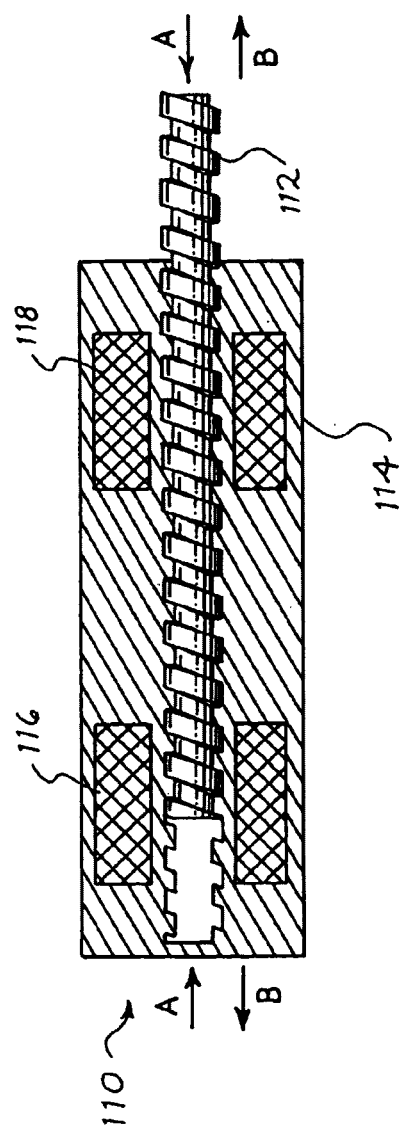
FIG. 2 is a cross-sectional view of a power screw preferably used in a regenerative damper.

The regenerative voltage 18 is a voltage produced by each regenerative damper, preferably through the use of a power screw. A power screw 110 is any mechanical device that generates rotation or torque from an axial force. A cross-sectional view of one embodiment of the power screw 110 is shown in FIG. 2. Generally, a power screw 110 consists of a threaded rod 112 which screws in or out of a housing 114 with a relatively low resistance.

Axial compression forces on the rod 112 and the housing 114, shown by arrows marked "A," drive the rod 112 into the housing 114, concomitantly causing the rod 112 to rotate with respect to the housing 114. Axial extension forces on the rod 112 and the housing 114, shown by arrows marked "B," drive the rod 112 out of the housing 114, concomitantly causing the rod 112 to rotate in the opposite direction. Preferably the power screw 110 is a recirculating ball screw, but the power screw 110 may be any power screw 110 known to one of skill in the art. A recirculating ball screw is characterized by a threaded rod 112 portion and a housing 114 which holds recirculating ball bearings.

Because the operation of a recirculating power screw 110 is analogous to a conventional permanent magnet alternator, the rod 112 is also referred to as a rotor and the housing 114 is also referred to as a stator. The rotor contains at least one magnet (not shown). Preferably the magnet is a permanent magnet, but any type of magnet could be used. Using more than one magnet or using magnets with a large strength increases the damping forces within the regenerative dampers. Additionally, the stator 114 contains at least one alternator 116. Preferably, the alternator 116 is a three-phase winding alternator, but any type of alternator could be used. If the stator 114 contains multiple alternators 116, 118 the alternators are preferably connected electrically in series.

The axial forces on the rotor 112 drive the rotation of the rotor 112 within the stator 114, causing the rotor magnet to rotate with respect to the alternators 116, 118. The rotation of the magnet creates magneto-electric induction and the flow of electrical current. It is this current that passes through a rectifier circuit and a DC-DC converter to create the regenerative voltage 18.

The damping forces within the regenerative damper are created by a resistive current flow in the 3-phase winding. The resistive current flow creates damping forces within the regenerative damper by creating a flux within the alternators 116, 118 that opposes the flux created from the current flow the rod 112 creates during high speed rotation within the alternators 116, 118. The opposing flux and the resistance to flux changes within the alternators 116, 118 slows down the linear direction of travel of the rod 112, resulting in damping forces within the damper.

Each regenerative damper is electrically connected to the module 4. Through this electrical connection, the module 4 and regenerative dampers are in direct communication such that the module 4 reads the regenerative travel direction signal 20 and the regenerative voltage 18.

The module 4 is additionally electrically connected to the electric switch 14. Through this electrical connection, the module 4 and the electric switch 14 are in direct communication such that the module 4 dictates switch settings and levels for the electrical connections of each regenerative damper connected to the electric switch 14.

Preferably, each regenerative damper is electrically connected to the electric switch 14. The electric switch 14 and the regenerative dampers are electrically connected such that the electric switch 14 can complete the circuitry of each regenerative damper depending on the switch setting. The electric switch 14 has three settings for each regenerative damper, Fully-Off 24, Power Resistance 26, and Battery Charge 28. When the Fully-Off 24 setting is selected, the electric switch 14 creates an open circuit in the circuitry of the regenerative damper which prevents current from flowing within the damper. The lack of current flow results in no damping forces within the damper.

When the Power Resistance 26 setting is selected, the electric switch 14 closes the circuitry of the regenerative damper with a resistance. The closed circuit allows current to flow within the damper, resulting in damping forces within the damper created by a resistive flux in the alternators 116, 118.

When the Battery Charge 28 setting is selected, the electric switch 14 completes the circuitry of the regenerative damper with a set of circuitry for charging the battery 16. Creating a closed circuit allows current to flow within the damper to create damping forces and allows current to flow into the battery for charging.

In both the Power Resistance 26 setting and the Battery Charge 28 setting, the electric switch 14 further controls the current flow, and therefore the damping forces, within each regenerative damper through high frequency pulse width modulation. Using pulse width modulation allows the electric switch 14 to vary the damping forces within a regenerative damper by adjusting the average current flowing within a regenerative damper.

When the electric switch 14 does not modify the current within a particular damper, the electric switch 14 is at a Fully-On level. A Fully-On level maximizes the damping forces of the regenerative damper. When the electric switch modifies the current within a regenerative damper to create less damping forces within the damper, the electric switch is at a Partially-On level.

The module 4 changes the electric switch 14 level between Partially-On and Fully-On depending on the regenerative travel direction signal 20 from the specific damper. Preferably, the module 4 changes the electric switch 14 level for a particular damper to Partially-On when a regenerative damper is in a compression state and changes the electric switch 14 level for a particular damper to Fully-On when a regenerative damper is in a rebound state.

Figure 3:
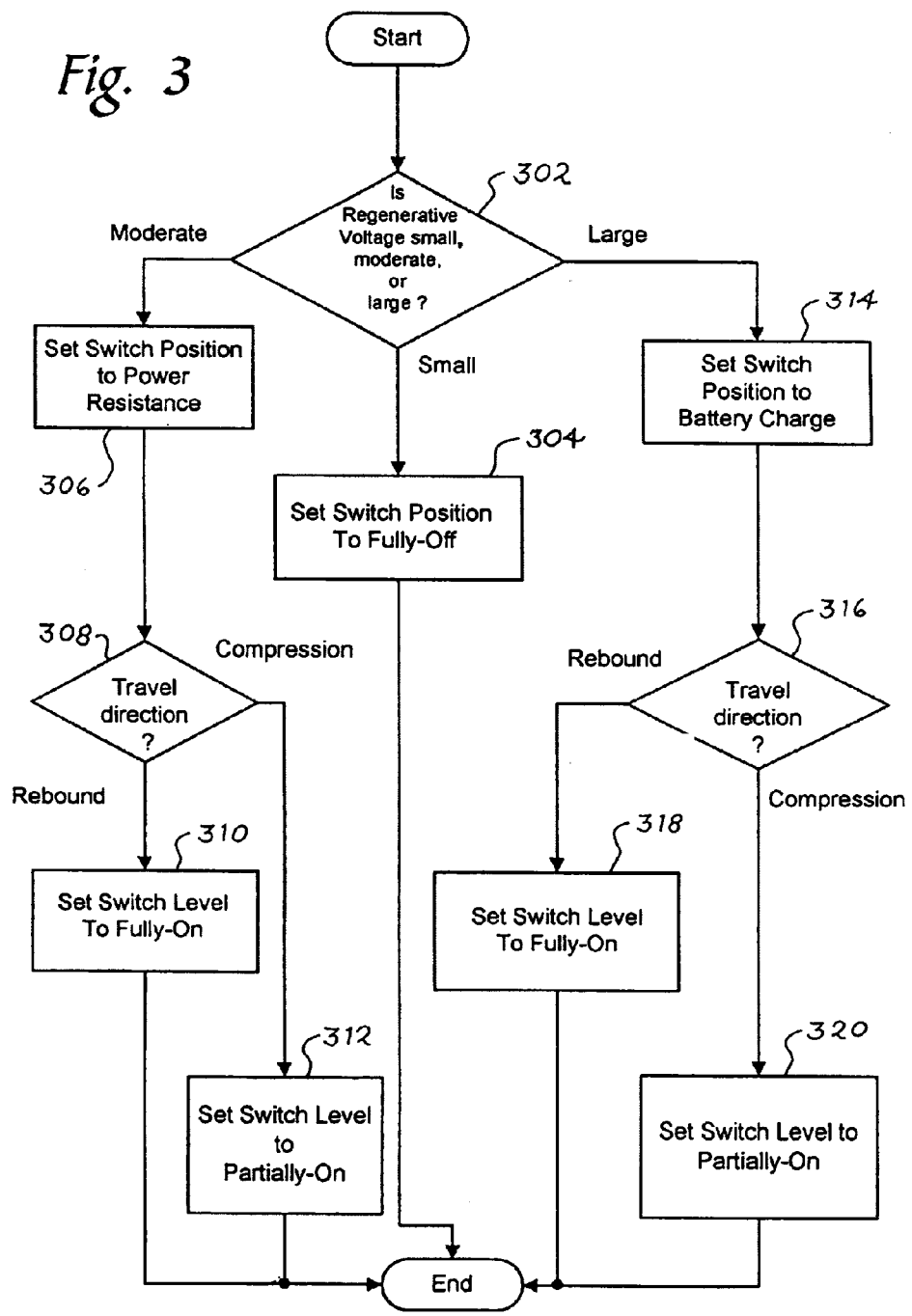
FIG. 3 is a flowchart of a regenerative passive suspension strategy.

During operation of the suspension system 2, each regenerative damper converts mechanical vibration energy into regenerative voltage 18, which each damper passes to the module 4 along with the regenerative travel direction signal 20. As shown in FIG. 3, the module 4, implementing a regenerative passive suspension strategy among all the regenerative dampers, measures the regenerative voltage 18 level from each damper and categorizes the regenerative voltage 18 level as small, moderate, or large 302.

The small, moderate, and large voltage categorizations are different for each vehicle, but each voltage categorization is directly related to the damping force needed at a specific time in the system 2. In general, a voltage level indicative of low damping force needs is categorized as a small voltage; a voltage level indicative of moderate damping force needs, which would create insufficient current to charge the battery 16 is categorized as a moderate voltage; and a voltage level indicative of large damping force needs, which would create sufficient current to charge the battery 16 is categorized as a large voltage.

When the module 4 categorizes the regenerative voltage 18 level from a regenerative damper as small 304, it commands the electric switch 14 to set the switch setting for that specific damper to Fully-Off 24 so that no damping forces oppose the movement of the rod 112 within the alternators 116, 118.

When the module 4 categorizes the regenerative voltage 18 level from a regenerative damper level as moderate 306, it commands the electric switch 14 to set the switch setting for that specific damper to Power Resistance 26. Closing the regenerative damper circuitry with a resistance allows current to flow within the damper, thereby creating damping forces within the damper. The module 4 then determines a proper switch level by reading the regenerative travel direction signal 20 of the damper. When the regenerative travel direction signal 20 indicates a rebound 310 in the damper, the module 4 sets the electric switch 14 level for the damper to Fully-On. Otherwise, the module 4 sets the electric switch 14 level for the particular regenerative damper to Partially-On.

When the module 4 categorizes the regenerative voltage 18 level from a particular damper as large 314, it commands the electric switch 14 to set the switch setting for that specific damper to the Battery Charge setting 28. The module 4 then determines a proper switch level by reading the regenerative travel direction signal 20 of the damper. When the regenerative travel direction signal 20 indicates a rebound 318, the module 4 sets the electric switch 14 level for the damper to Fully-On. Otherwise 320, the module 4 sets the electric switch 14 level to Partially-On.

This process continually repeats within the system 2 to constantly adjust suspension settings and recover power lost during damping. Additional regenerative passive suspension strategies may also be implemented using various logical orders where the module 4 measures the regenerative travel direction signal 20 before measuring the regenerative voltage 18.

Figure 4:
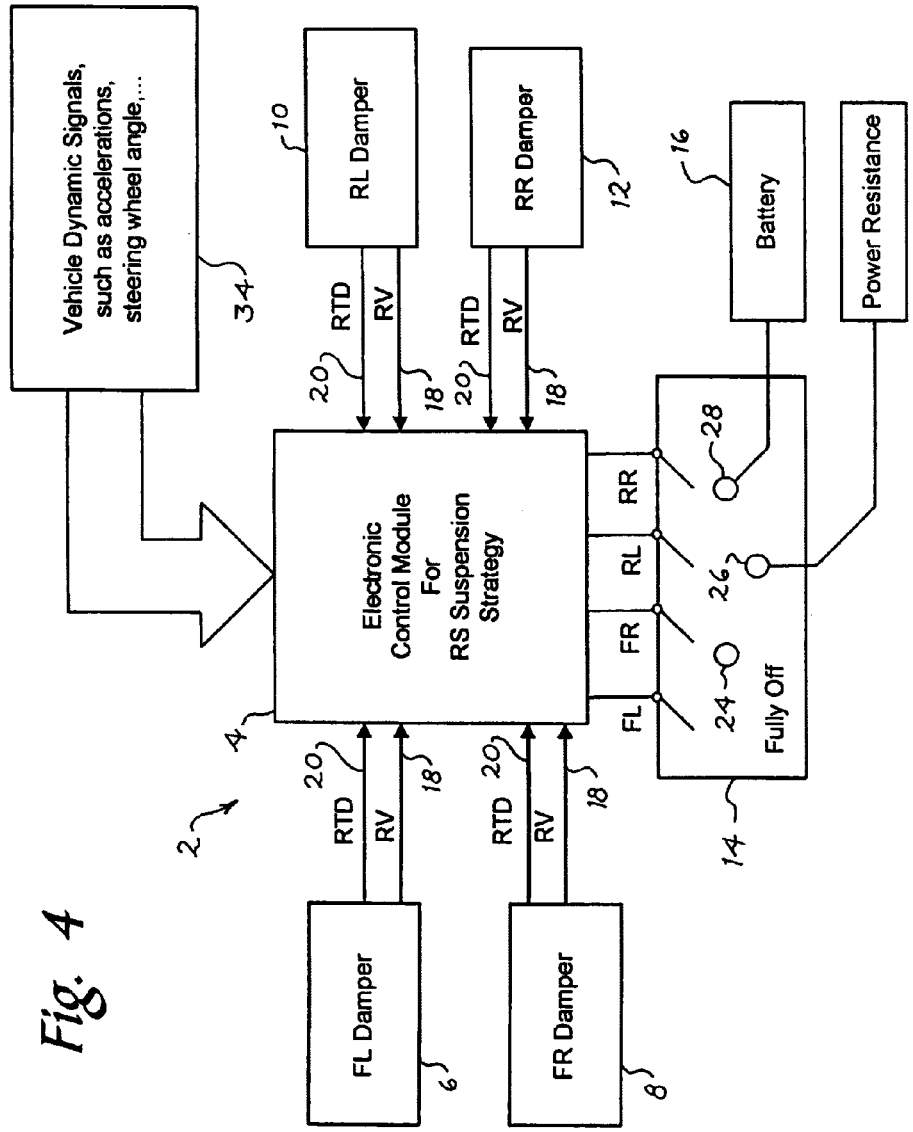
FIG. 4 is a schematic diagram of a regenerative semi-active suspension system in accordance with the present invention.

In a second embodiment of the invention shown in FIG. 4, the system 2 acts as a regenerative semi-active suspension due to the module 4 implementing a regenerative semi-active suspension strategy. A semi-active control suspension strategy is one in which the at least one regenerative damper has a variable damping force-relative velocity relationship.

As shown in FIG. 4, the module 4, FL damper 6, FR damper 8, RL damper 10, RR damper 12, electric switch 14, and battery 16 are in communication in the same manner as the previous embodiment shown in FIG. 1. The difference between the two embodiments is the addition of a set of vehicle dynamic signals 34 in the regenerative semi-active suspension system.

The set of vehicle dynamic signals 34 is input to the module 4 and preferably contains information such as the (vertical, lateral, and/or longitudinal) acceleration of the vehicle, the steering wheel angle, the engine throttle level, and a braking signal. This information allows the module 4 to adjust the damping force within each regenerative damper more precisely depending on the set of vehicle dynamic signals 34 to achieve greater vehicle performance.

Figure 5:
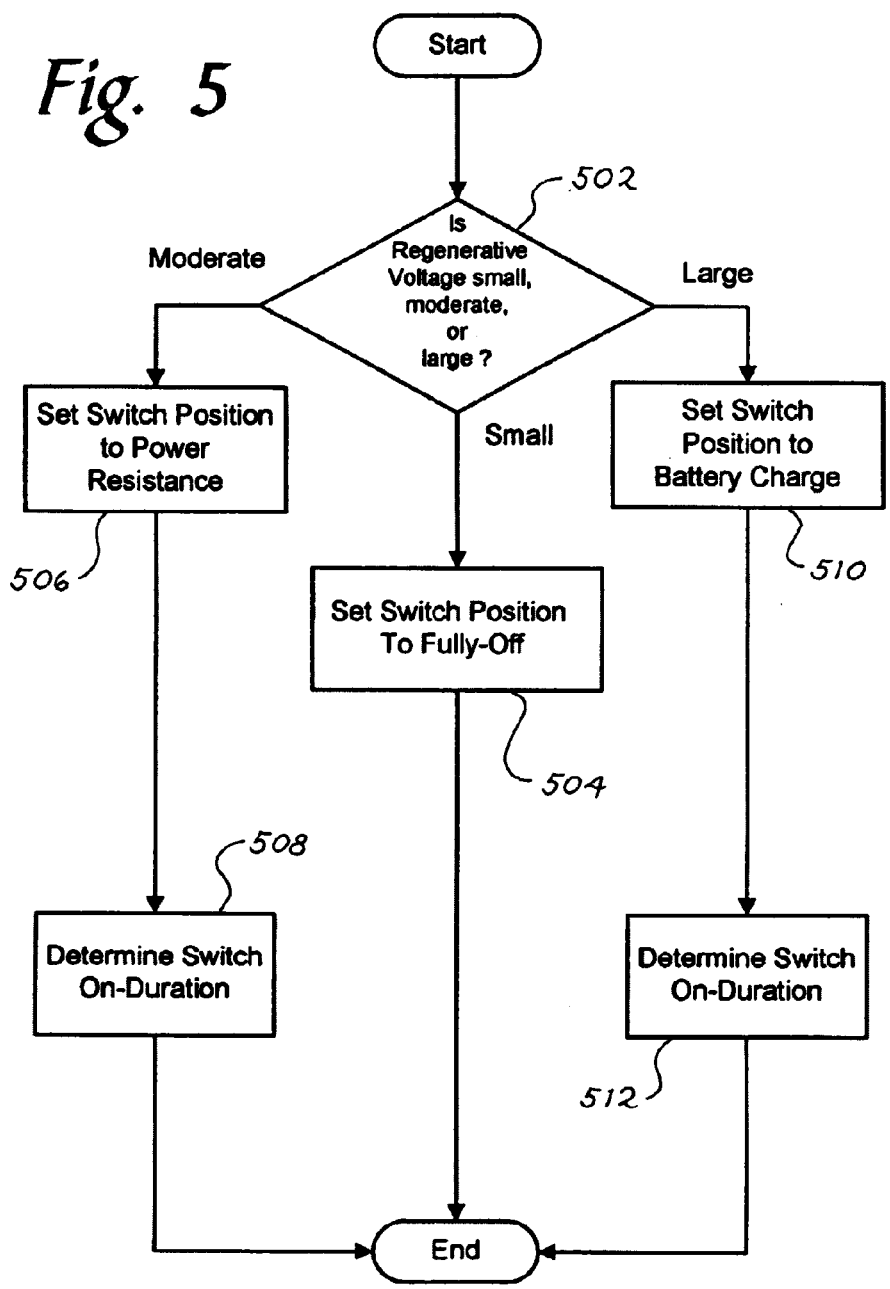
FIG. 5 is a flowchart of a regenerative semi-active suspension strategy.

As in the previous embodiment, during operation each regenerative damper converts mechanical vibration energy into regenerative voltage 18. Each regenerative damper passes the regenerative voltage 18 to the module 4 along with a regenerative travel direction signal 20. As shown in FIG. 5, the module 4, implementing a regenerative semi-active suspension strategy, measures the regenerative voltage 18 level from each damper and categorizes the voltage level as small, moderate, or large 502. When the module 4 categorizes the regenerative voltage 18 level from a particular damper as small 504, it commands the electric switch 14 to set the switch setting for the particular damper to Fully-Off so that there are no damping forces within the damper. When the module 4 categorizes the regenerative voltage 18 level from a particular damper as moderate 506, the module 4 sets the electric switch 14 setting to Power Resistance 26. Using the set of vehicle dynamic signals 34 and the regenerative travel direction signal 20, the module 4 then adjusts the level of damping forces in the damper by determining an On-Duration according to a Semi-Active Control Strategy 508. The On-Duration is a time period for the pulse width modulation that effectively changes the average amount of current flowing within a regenerative damper at any given time to create an electric switch level anywhere between the ranges of Fully-Off and Fully-On. Due to the direct relationship between the current flowing in a regenerative damper at a given point and the damping forces within the damper at a given point, determining the On-Duration as a function of the vehicle dynamic signals 34 allows the module more precise control over the individual damping forces within each regenerative damper. The Semi-Active Control Strategy can be any strategy a user desires to adjust the performance of a vehicle.

Finally, when the module 4 categorizes the regenerative voltage 18 level from a particular damper as large 510, the electric control module 4 sets the electric switch 14 setting to Battery Charge 28. Using the set of vehicle dynamic signals 34 and the regenerative travel direction signal 20, the module 4 then determines the On-Duration for the damper based on the Semi-Active Control Strategy 512.

This process continually repeats within the system 2 to constantly adjust suspension settings and recover power lost during damping.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A regenerative suspension system comprising:
    a regenerative damper comprising a power screw operative to convert vibration energy into rotational motion to generate an electrical current, the regenerative damper operative to convert the generated electrical current into a regenerative voltage and to generate a regenerative travel direction signal indicating whether the regenerative damper is in a compression state or a rebound state;
    a module electrically connected to the regenerative damper, the module operative to measure the regenerative travel direction signal and the regenerative voltage, determine an electric switch setting based at least in part on the measured regenerative voltage, and determine an electric switch level based at least in part on the measured regenerative travel direction signal;
    a battery to store electric energy; and
    an electric switch, electrically connected to the module, regenerative damper, and battery, the electrical switch operative to receive commands from the module dictating electric switch settings and electric switch levels for the electrical connections to the regenerative dampers;
    wherein a damping force within the regenerative damper varies in response to the electric switch settings and the electric switch levels for the electrical connections to the regenerative damper.

2. The regenerative suspension system of claim 1, wherein the module determines an electric switch setting of Fully-Off when the module determines no damping forces are necessary within the regenerative damper.

3. The regenerative suspension system of claim 1, wherein the module determines an electric switch setting of Power Resistance when the module determines damping forces are necessary within the regenerative damper.

4. The regenerative suspension system of claim 3, wherein the module determines an electric switch level of Fully-On when the regenerative travel direction signal indicates the regenerative damper is in a rebound state and the electric switch setting is Power Resistance.

5. The regenerative suspension system of claim 3, wherein the module determines an electric switch level of Partially-On when the regenerative travel direction signal indicates the regenerative damper is in a compression state and the electric switch setting is Power Resistance.

6. The regenerative suspension system of claim 1, wherein the module determines an electric switch setting of Battery Charge when the module determines the regenerative voltage is large enough to charge the battery.

7. The regenerative suspension system of claim 6, wherein the module determines an electric switch level of Fully-On when the regenerative travel direction signal indicates the regenerative damper is in a rebound state and the electric switch setting is Battery Charge.

8. The regenerative suspension system of claim 6, wherein the module determines an electric switch level of Partially-On when the regenerative travel direction signal indicates the regenerative damper is an a compression state and the electric switch setting is Battery Charge.

9. The regenerative suspension system of claim 1, further comprising a set of dynamic vehicle signals, the dynamic vehicle signals read by the module.

10. The regenerative suspension system of claim 9, wherein the module determines electric switch settings and electric switch levels based at least in part on the measured regenerative voltage, measured regenerative travel direction signal, and dynamic vehicle signals.

11. The regenerative suspension system of claim 10, where in the module adjusts an On-Duration of the electric switch based at least in part on the dynamic vehicle signals.

12. The regenerative suspension system of claim 10, wherein the dynamic vehicle signals comprise an acceleration of a vehicle.

13. The regenerative suspension system of claim 10, wherein the dynamic vehicle signals comprise a steering wheel angle.

14. The regenerative suspension system of claim 10, wherein the dynamic vehicle signals comprise an engine throttle level.

15. The regenerative suspension system of claim 10, wherein the dynamic vehicle signals comprise a braking signal.

* * * * *